(12) United States Patent
Kim et al.

(10) Patent No.: US 9,868,388 B2
(45) Date of Patent: Jan. 16, 2018

(54) APPARATUS AND METHOD FOR CONTROLLING TURN SIGNAL FOR ELECTRONIC MULTIFUNCTION SWITCH

(71) Applicants: HYUNDAI MOTOR COMPANY, Seoul (KR); DAESUNG ELECTRIC CO., LTD., Ansan-si, Gyeonggi-do (KR)

(72) Inventors: Sung Eun Kim, Seoul (KR); Bong Gi Song, Suwon-si (KR); Dae Wook Kwon, Gunpo-si (KR); Seag Woo Lee, Gunpo-Si (KR)

(73) Assignees: Hyundai Motor Company, Seoul (KR); Daesung Electric Co., Ltd., Ansan-si, Gyeonggi-do (KR)

( * ) Notice: Subject to any disclaimer, the term of this patent is extended or adjusted under 35 U.S.C. 154(b) by 0 days.

(21) Appl. No.: 15/196,835

(22) Filed: Jun. 29, 2016

(65) Prior Publication Data
US 2017/0166114 A1 Jun. 15, 2017

(30) Foreign Application Priority Data
Dec. 9, 2015 (KR) .......................... 10-2015-0175426

(51) Int. Cl.
*B60Q 1/42* (2006.01)
*B60R 16/00* (2006.01)
(Continued)

(52) U.S. Cl.
CPC ............... *B60Q 1/42* (2013.01); *B60Q 1/346* (2013.01); *B60Q 1/40* (2013.01); *B60R 16/005* (2013.01); *B62D 15/021* (2013.01)

(58) Field of Classification Search
CPC .......... B60Q 1/34; B60Q 1/343; B60Q 1/346; B60Q 1/40; B60Q 1/42; B62D 15/021; B60R 16/005
(Continued)

(56) References Cited

U.S. PATENT DOCUMENTS

| 2012/0271510 | A1* | 10/2012 | Seymour | B60Q 1/346 |
| | | | | 701/36 |
| 2014/0309855 | A1* | 10/2014 | Tran | B60Q 1/38 |
| | | | | 701/36 |
| 2015/0070161 | A1* | 3/2015 | Mizuno | B60Q 1/40 |
| | | | | 340/465 |

FOREIGN PATENT DOCUMENTS

| JP | 2001-039213 A | 2/2001 |
| JP | 2004-182161 A | 7/2004 |

(Continued)

*Primary Examiner* — Brian Wilson
(74) *Attorney, Agent, or Firm* — McDermott Will & Emery LLP

(57) ABSTRACT

An apparatus for controlling a turn signal for an electronic multifunction switch includes a multifunction switch equipped with a turn switch; a steering angle provision device configured to provide information about a steering angle of a vehicle; a path provision device configured to provide information about a location and a path of the vehicle; a lane information provision device configured to provide information about lanes around the vehicle; and a controller configured to receive manipulation state information of the multifunction switch, the steering angle information from the steering angle provision device, the path information from the path provision device, and the lane information from the lane information provision device, and to control a blinking state of a turn signal light of the vehicle.

15 Claims, 6 Drawing Sheets

(51) Int. Cl.
*B62D 15/02* (2006.01)
*B60Q 1/34* (2006.01)
*B60Q 1/40* (2006.01)

(58) Field of Classification Search
USPC .................................. 340/468, 475, 476, 477
See application file for complete search history.

(56) References Cited

FOREIGN PATENT DOCUMENTS

| KR | 10-1999-0049021 A | 7/1999 | | |
|----|-------------------|--------|---|---|
| KR | 10-2003-0032431 A | 4/2003 | | |
| KR | 10-2005-0115134 A | 12/2005 | | |
| KR | 10-2006-0079507 A | 7/2006 | | |
| KR | 10-2008-0020560 A | 3/2008 | | |
| KR | 10-2014-0045696 A | 4/2014 | | |
| KR | 10-1390906 B1 | 5/2014 | | |
| KR | 10-2015-0124678 A | 11/2015 | | |
| WO | WO/2014/010695 | * | 1/2014 | ............... B60Q 1/38 |

* cited by examiner

APPARATUS AND METHOD FOR CONTROLLING TURN SIGNAL FOR ELECTRONIC MULTIFUNCTION SWITCH

CROSS REFERENCE TO RELATED APPLICATION

The present application claims the benefit of priority to Korean Patent Application No. 10-2015-0175426, filed on Dec. 9, 2015 the entire content of which is incorporated herein for all purposes by this reference.

TECHNICAL FIELD

The present disclosure generally relates to an electronic multifunction switch for a vehicle, and more particularly, to a technology for controlling an on/off state of a turn signal light of a vehicle.

BACKGROUND

A vehicle is equipped with a multifunction switch configured to control a sidelight, a headlight, a turn signal light, etc. of the vehicle. A driver operates the turn signal light using the multifunction switch to indicate that he or she intends to change a direction of the vehicle or change a lane.

A conventional mechanical multifunction switch has an auto-cancel function that returns a turn signal light to a neutral state for turning off the turn signal light that automatically blinks when a steering wheel returns to a neutral position after being manipulated by a driver. Such a mechanical malfunction switch has a tendency to cause noise when there is a mechanical mechanism.

Recently, an electronic turn signal control device has been developed and configured to electronically control the on/off state of a turn signal light without mechanical operation, thus reducing mechanical manipulation noise. However, such an electronic turn signal control device configured to allow a driver to identify a change in a lane or a change in a vehicle direction by separately manipulate the device, thus prompting the driver to make a precise decision in advance when manipulating the device. For example, when the driver desires to change a lane and a direction change signal rather than a lane change signal is applied due to erroneous manipulation, use convenience is deteriorated because the driver must manually release a direction change signal.

The foregoing is intended merely to aid in the better understanding of the background of the present disclosure, and is not intended to mean that the present disclosure falls within the purview of the related art that is already known to those skilled in the art.

SUMMARY

The present disclosure has been made keeping in mind the above problems occurring in the prior art, and an object of the present disclosure is to provide an apparatus and method for controlling a turn signal for an electronic multifunction switch, which not only can cancel manipulation noise caused by the manipulation of the multifunction switch and operation of an auto-cancel function, but also can automatically generate and release a lane change signal and a direction change signal without a user's intentional manipulation and can automatically control to meet a driving situation even if erroneous manipulation has occurred, thus maximizing user convenience and ultimately improving the marketability of vehicles.

According to an exemplary embodiment in the present disclosure, an apparatus for controlling a turn signal for an electronic multifunction switch includes a multifunction switch equipped with a turn switch; a steering angle provision device configured to provide information about a steering angle of a vehicle; a path provision device configured to provide information about a location and a path of the vehicle; a lane information provision device configured to provide information about lanes around the vehicle; and a controller configured to receive manipulation state information of the multifunction switch, the steering angle information from the steering angle provision device, the path information from the path provision device, and the lane information from the lane information provision device, and to control a blinking state of a turn signal light of the vehicle.

The controller may be configured to, when the turn switch provided in the multifunction switch is turned off to apply a turn signal, execute an auto-on subroutine of blinking the turn signal light by automatically turning on the turn signal. When the turn switch is turned on, the controller may execute an auto-off subroutine of turning off the turn signal light by automatically turning off the turn signal.

The auto-on subroutine may include a path acquisition operation of acquiring information about a travel path and a current location of the vehicle from the path provision device; a direction change determination operation of determining that a current situation is a direction change situation when the current location of the vehicle is present within a first reference distance from an approaching turning point on the travel path, based on the travel path and the current location of the vehicle; a turning direction determination operation of determining whether a turning direction is for a left turn or a right turn when the current situation is the direction change situation as a result of performing the direction change determination operation; and a direction change blinking initiation operation of blinking a turn signal light for the corresponding direction, based on a result of performing the turning direction determination operation.

The auto-on subroutine may further include a steering level determination operation of, if the current situation is not the direction change situation as a result of performing the direction change determination operation, determining whether the steering angle provided from the steering angle provision device is equal to or greater than a first reference steering angle that is set to determine a lane change of the vehicle; a lane information acquisition operation of, if the steering angle is equal to or greater than the first reference steering angle as a result of performing the steering level determination operation, acquiring the lane information from the lane information provision device; a lane change determination operation of determining that the current situation is a lane change situation when it is checked that a distance between the vehicle and a lane that the vehicle is approaching is reduced within a second reference that is set to determine the lane change of the vehicle, based on the lane information acquired in the lane information acquisition operation; a lane change direction determination operation of, if it is determined in the lane change determination operation that the current situation is the lane change situation, determining whether the lane change is a change to a left lane or to a right lane; and a lane change blinking initiation operation of, based on a result of performing the lane change direction determination operation, blinking a turn signal light for the corresponding direction.

The apparatus may further include a blind spot information provision device configured to provide the controller with blind spot information indicating whether another vehicle is present in a blind spot of the vehicle, wherein the lane change determination operation determines that the current situation is a lane change situation when another vehicle is not present in the blind spot of the vehicle, based on the blind spot information from the blind spot information provision device.

The apparatus may further include a driver information provision device for providing information about a state of a vehicle driver to the controller, wherein the lane change determination operation is configured to determine that the current situation is a lane change situation when the driver is determined to be in a normal state, based on the driver information from the driver information provision device.

The auto-off subroutine may include a switch direction check operation of checking which one of a left direction and a right direction of the turn switch in the multifunction switch is turned on; a release determination operation of determining whether a release condition for the turn switch for a direction based on a result of performing the switch direction check operation is satisfied; and an off operation of turning off a turn signal light for the direction determined to satisfy the release condition in the release determination operation.

The turn switch release condition determined in the release determination operation may determine a case where the steering angle from the steering angle provision device becomes equal to or greater than a second reference steering angle and then returns to an original position, wherein the second reference steering angle is set to indicate that steering is performed in a direction identical to a turn-on direction of the turn switch; and a case where steering is performed when the steering angle from the steering angle provision device is equal to or greater than a third reference steering angle in a direction opposite to the turn-on direction of the turn switch. When one or more of the above two cases occur, it is determined that the release condition is satisfied.

The turn switch release condition determined in the release determination operation may be satisfied when a user manually manipulates the multifunction switch in a direction identical to or opposite to a current turn-on direction of the turn switch.

The apparatus may further include a vehicle speed information provision device configured to provide information about a speed of the vehicle to the controller. The turn switch release condition determined in the release determination operation is satisfied when the steering angle from the steering angle provision device is maintained at a fourth reference steering angle or less. The fourth reference steering angle is set to be less than that of the direction change or lane change. The turn switch release condition determined in the release determination operation is further satisfied when the vehicle speed from the vehicle speed information provision device is maintained at a reference vehicle speed or more. The reference vehicle speed is set to indicate that the vehicle is traveling. The turn switch release condition determined in the release determination operation is further satisfied when a period of time for which a turn-on state is maintained after the turn switch has been turned on exceeds a predetermined reference time or longer.

The apparatus may further include a smart switch configured to provide a signal required to turn on or off a smart function depending on user manipulation to the controller. The controller is configured to use results of comparing the steering angle from the steering angle provision device with reference steering angles based on the current situation of the vehicle to control a blinking state of the turn signal light. The controller is further configured to, when the smart switch is turned on, vary the reference steering angles in association with the vehicle speed, and apply the varied reference steering angles.

According to another exemplary embodiment in the present disclosure, a method for controlling a turn signal for an electronic multifunction switch includes a turn switch state check operation of checking, by a controller, a state indicating whether a turn switch provided in a multifunction switch, is turned on or off; an auto-on subroutine of, if the turn switch is turned off as a result of performing the turn switch state check operation, blinking, by the controller, a turn signal light of the vehicle by automatically turning on the turn signal; and an auto-off subroutine of, when the turn switch is turned on as a result of performing the turn switch state check operation, turning off, by the controller, the turn signal light by automatically turning off the turn signal.

The auto-on subroutine may include a path acquisition operation of acquiring information about a travel path and a current location of the vehicle from a path provision device; a direction change determination operation of determining that a current situation is a direction change situation when the current location of the vehicle is present within a predetermined first reference distance from an approaching turning point on the travel path, based on the travel path and the current location of the vehicle; a turning direction determination operation of determining whether a turning direction is for a left turn or a right turn if the current situation is the direction change situation as a result of performing the direction change determination operation; and a direction change blinking initiation operation of blinking a turn signal light for the corresponding direction, based on a result of performing the turning direction determination operation.

The auto-on subroutine may include a steering level determination operation of, if the current situation is not a direction change situation as a result of performing the direction change determination operation, determining whether a steering angle provided from a steering angle provision device is equal to or greater than a first reference steering angle that is set to determine a lane change of the vehicle; a lane information acquisition operation of, if the steering angle is equal to or greater than the first reference steering angle as a result of performing the steering level determination operation, acquiring the lane information from a lane information provision device; a lane change determination operation of determining that the current situation is a lane change situation when it is checked that a distance between the vehicle and a lane that the vehicle is approaching is reduced to a second reference distance or less, based on the lane information acquired in the lane information acquisition operation, wherein the second reference distance enables the lane change to be determined; a lane change direction determination operation of, if it is determined in the lane change determination operation that the current situation is the lane change situation, determining whether the lane change is a change to a left lane or to a right lane; and a lane change blinking initiation operation of, based on a result of performing the lane change direction determination operation, blinking a turn signal light for the corresponding direction.

The lane change determination operation may determine that the current situation is a lane change situation when another vehicle is not present in a blind spot of the vehicle, based on blind spot information from a blind spot information provision device for providing the controller with blind spot information indicating whether another vehicle is present in the blind spot of the vehicle.

The lane change determination operation may determine that the current situation is a lane change situation when the driver is determined to be in a normal state, based on driver information from a driver information provision device for providing information about a state of the vehicle driver to the controller.

The auto-off subroutine may include a switch direction check operation of checking which one of a left direction and a right direction of the turn switch in the multifunction switch has been turned on; a release determination operation of determining whether a release condition for the turn switch for a direction based on a result of performing the switch direction check operation is satisfied; and an off operation of turning off a turn signal light for the direction determined to satisfy the release condition in the release determination operation.

The turn switch release condition determined in the release determination operation may determine a case where the steering angle from the steering angle provision device becomes equal to or greater than a second reference steering angle and then returns to an original position, wherein the second reference steering angle is set to indicate that steering is performed in a direction identical to a turn-on direction of the turn switch; and a case where steering is performed in a state in which the steering angle from the steering angle provision device is equal to or greater than a predetermined third reference steering angle in a direction opposite to the turn-on direction of the turn switch. When one or more of the above two cases occur, it is determined that the release condition is satisfied.

The turn switch release condition determined in the release determination operation may be satisfied when a user manually manipulates the multifunction switch in a direction identical to or opposite to a current turn-on direction of the turn switch.

The turn switch release condition determined in the release determination operation may be satisfied: when the steering angle from the steering angle provision device is maintained at a fourth reference steering angle or less, wherein the fourth reference steering angle is set to be less than that of the direction change or lane change; when a vehicle speed from a vehicle speed information provision device for providing vehicle speed information to the controller is maintained at a reference vehicle speed or more, wherein the reference vehicle speed is set to indicate that the vehicle is traveling; and when a period of time for which a turn-on state is maintained after the turn switch has been turned on exceeds a predetermined reference time or longer.

The controller may be configured to use the results of comparing the steering angle from the steering angle provision means with reference steering angles based on the current situation of the vehicle to control the blinking state of the turn signal light upon executing the auto-on subroutine and the auto-off subroutine. The controller may be further configured to, when a smart switch configured to provide a signal required to turn on/off a smart function to the controller depending on user manipulation is turned on, to vary the reference steering angles in association with the vehicle speed, and to apply the varied reference steering angles.

BRIEF DESCRIPTION OF THE DRAWINGS

The above and other objects, features and advantages of the present invention will be more clearly understood from the following detailed description taken in conjunction with the accompanying drawings.

DETAILED DESCRIPTION

Hereinafter, embodiments in the present disclosure will be described in detail with reference to the attached drawings.

Figure 1:
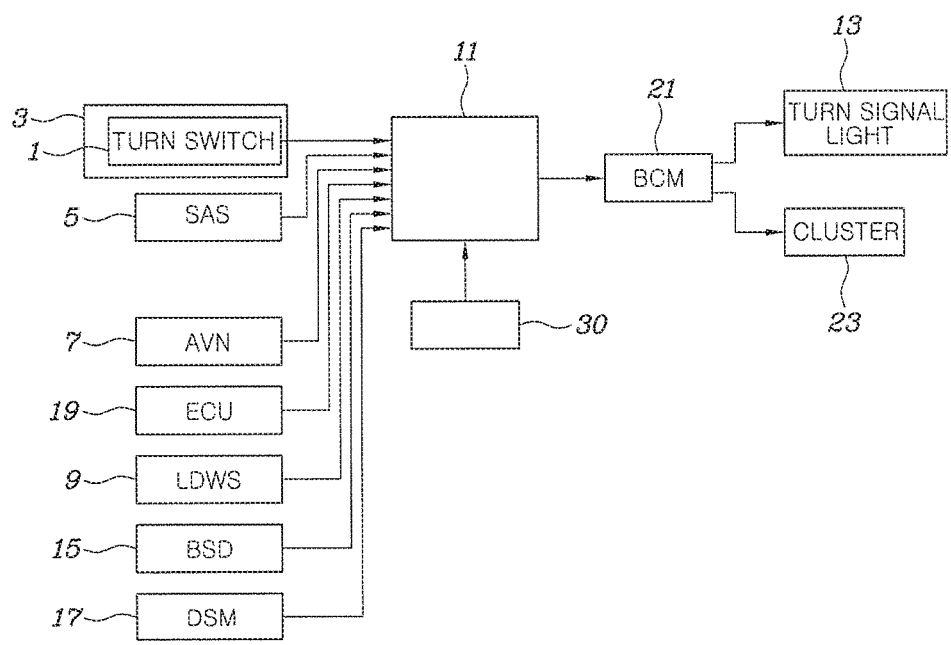
FIG. 1 is a configuration diagram showing an embodiment of an apparatus for controlling a turn signal for an electronic multifunction switch according to the present disclosure.

Referring to FIG. 1, an embodiment of an apparatus for controlling a turn signal for an electronic multifunction switch according to the present disclosure includes a multifunction switch 3 equipped with a turn switch 1; a steering angle provision means 5 for providing information about a steering angle of a vehicle; a path provision device 7 for providing information about a location and a path of the vehicle; a lane information provision device 9 for providing information about lanes around the vehicle; and a controller 11 for receiving information about a manipulation state of the multifunction switch 3, steering angle information from the steering angle provision means 5, path information from the path provision device 7, and lane information from the lane information provision device 9, and then controlling an on or off state of a turn signal light 13 of the vehicle.

The controller 11 is configured to receive a signal from the turn switch 1 manipulated by the multifunction switch 3, so that the turn switch 1 transfers user's intention to blink or turn off the turn signal light 13 for a required direction to the controller 11 via the manipulation of the multifunction switch 3 when changing the direction of the vehicle or the lane of the vehicle.

The controller 11 is configured to receive various types of information from the turn switch 1 of the above-described multifunction switch 3, the steering angle provision means 5, the path provision device 7, and the lane information provision device 9, process and determine the received information, and ultimately initiate or terminate a blinking state of the turn signal light 13 of the vehicle.

In the present disclosure, a steering angle sensor (SAS) may be used as the steering angle provision means 5, and an audio, video, navigation (AVN) system may be used as the path provision device 7, but any conventional simple navigation device may also be used instead of the AVN system. In addition, a lane departure warning system (LDWS) may be used as the lane information provision device 9.

The controller 11 may be further configured to receive information from a blind spot information provision device 15 that provides blind spot information indicating whether another vehicle is present in a blind spot of the vehicle. Here, a conventional blind spot detection (BSD) system may be used as the blind spot information provision device 15.

Furthermore, the controller 11 may be configured to receive information from a driver information provision device 17 capable of providing information about a state of a driver. The driver information provision device 17 may be implemented as a conventional driver state monitoring (DSM) system. Here, information provided to the controller 11 is information indicating whether the driver is dozy or the like.

Further, the controller 11 is configured to receive vehicle speed information from a vehicle speed information provision device 19 for providing vehicle speed information. The vehicle speed information provision device 19 may be implemented as a vehicle speed sensor or the like, or the vehicle speed information is received from an engine control unit (ECU).

In the present disclosure, the controller 11 is configured such that an output thereof is transferred to the turn signal light 13 through a separate controller, that is, a body control module (BCM) 21, or the controller 11 may be configured to directly control the turn signal light 13 without passing through the BCM 21 or the like. The controller 11 may be configured to control the turn signal light 13 and a cluster 23 in parallel in order to reflect a turn-on state of the turn signal light 13 in the cluster 23.

Figure 2:
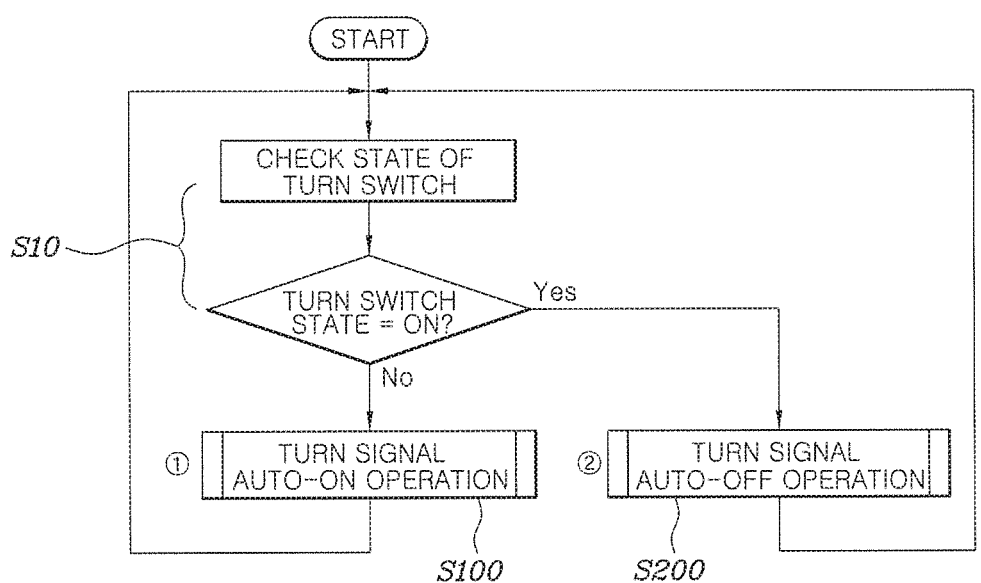
FIG. 2 is a flowchart showing a method for controlling a turn signal for an electronic multifunction switch according to the present disclosure.

Referring to FIG. 2, the controller 11 is configured to, when the turn switch 1 provided in the multifunction switch 3 is turned off, automatically turn on a turn signal and execute an auto-on subroutine S100 of blinking the turn signal light 13. When the turn switch is turned on, the controller 11 is configured to automatically turn off the turn signal and execute auto-off subroutine S200 of turning off the turn signal light 13.

Figure 3:
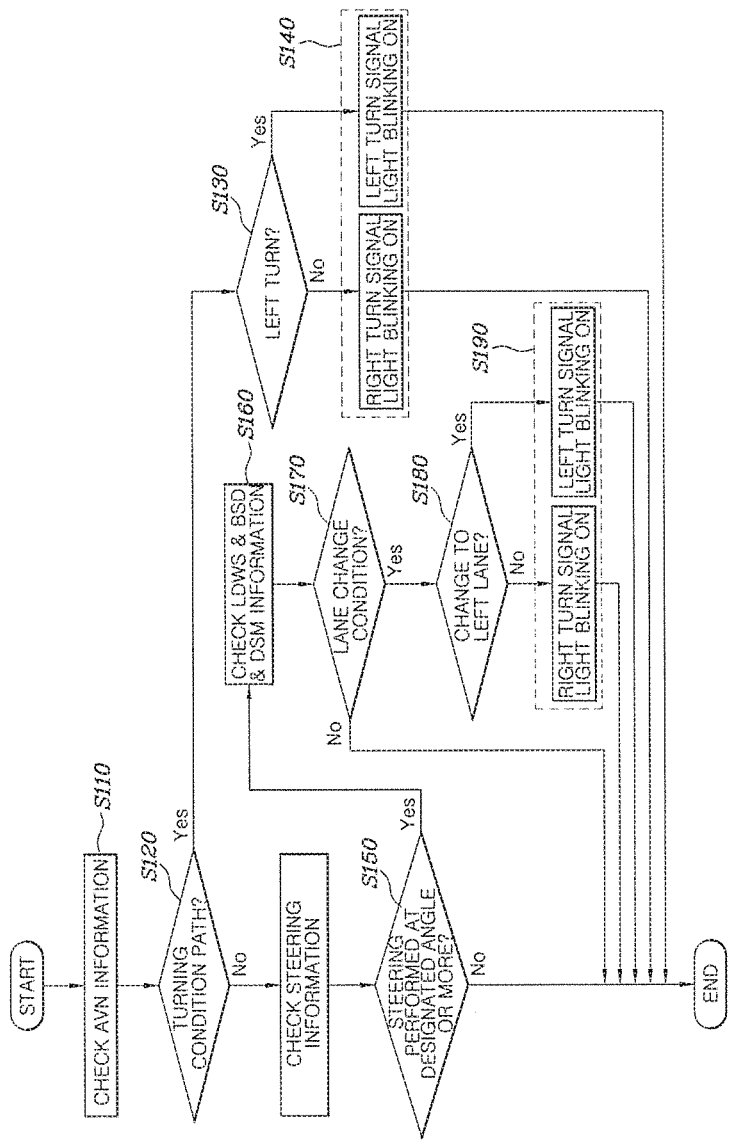
FIG. 3 is a flowchart showing an embodiment of the auto-on subroutine of FIG. 2.
Figure 4:
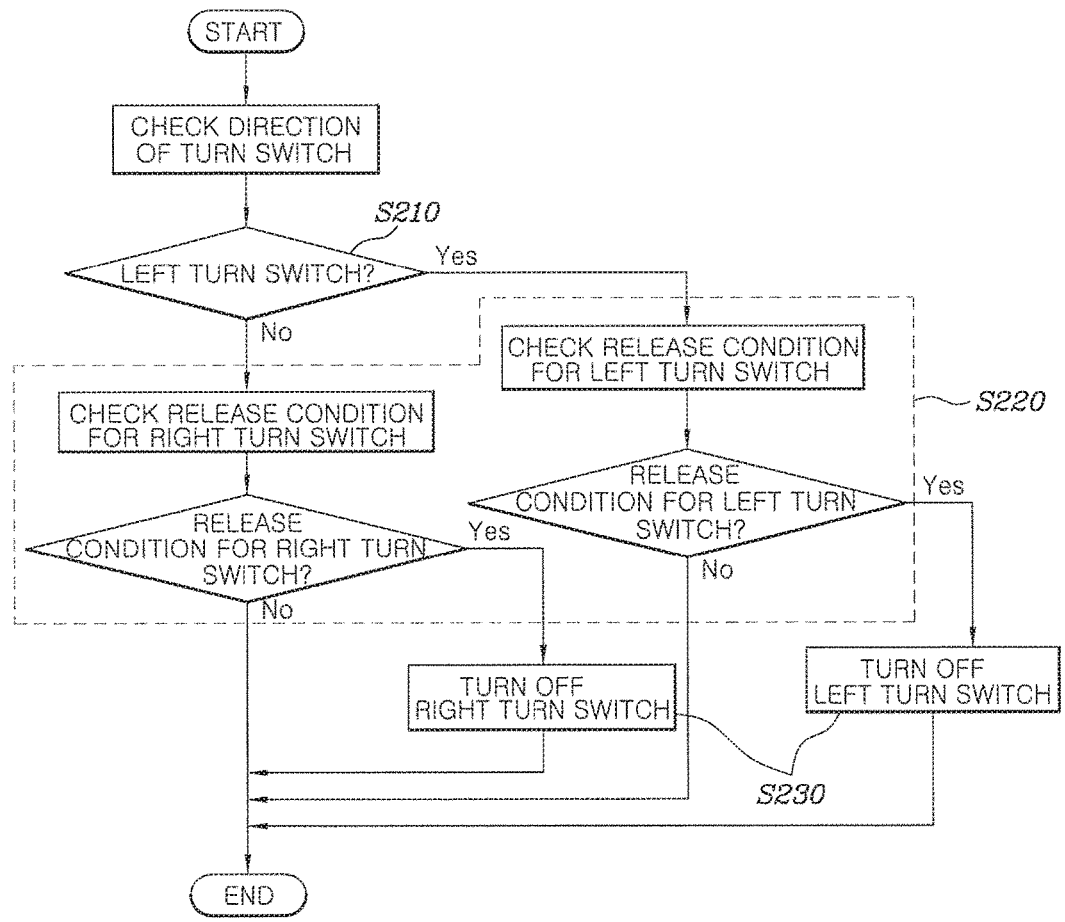
FIG. 4 is a flowchart showing an embodiment of the auto-off subroutine of FIG. 2.

As shown in FIG. 3, the auto-on subroutine S100 includes a path acquisition step S110 of acquiring information about a travel path of the vehicle and a current location of the vehicle from the path provision device 7; a direction change determination step S120 of determining, based on the travel path and the current location of the vehicle, that a current situation is a direction change situation when the current location of the vehicle is present within a first reference distance from an approaching turning point on the travel path; a turning direction determination step S130 of, if the current situation is the direction change situation as a result of performing the direction change determination step S120, determining whether the turning direction is for a left turn or a right turn; and a direction change blinking initiation step S140 of blinking a turn signal light for the corresponding direction based on the result of performing the turning direction determination step S130.

That is, if it is determined that the current location of the vehicle is present within the first reference distance from the point requiring direction change on the path provided to the controller, the controller automatically blinks the turn signal light for the corresponding direction according to the turning direction, so that the driver does not need to separately manipulate the multifunction switch, thus improving user convenience and preventing unnecessary manipulation noise from occurring.

Here, the first reference distance may be set to about 20 m to 70 m because a turn signal light is generally operated in advance from a point of distance of about several tens of meters from a point where a direction change is intended. Further, when the vehicle speed is higher, it is preferable to turn on the turn signal light at a distance farther away from the point where a direction change is intended, and thus, the first reference distance may be differently determine in association with the vehicle speed.

The auto-on subroutine S100 further includes a steering level determination step S150 of, if the current situation is not a direction change situation as a result of performing the direction change determination step S120, determining whether the steering angle provided by the steering angle provision means 5 is equal to or greater than a first reference steering angle that is set to enable the lane change of the vehicle; a lane information acquisition step S160 of acquiring lane information from the lane information provision device 9 if the steering angle is equal to or greater than the first reference steering angle as a result of performing the steering level determination step S150; a lane change determination step S170 of determining that the current situation is a lane change situation when it is checked that a distance between the vehicle and a lane that the vehicle is approaching is reduced to a second reference distance or less, based on the lane information acquired at the lane information acquisition step S160, wherein the second reference distance enables the lane change; a lane change direction determination step S180 of, if the current situation is the lane change situation as a result of performing the lane change determination step S170, determining whether the lane change is a change to a left lane or a right lane; and a lane change blinking initiation step S190 of blinking a turn signal light for the corresponding direction based on the result of performing the lane change direction determination step S180.

That is, when it is determined that the steering angle of the vehicle is equal to or greater than the first reference steering angle, and that the distance between the lane acquired from the lane information provision device and the vehicle is reduced to the second reference distance or less, this situation may be determined to be the lane change situation, and thus, the turn signal light 13 for the corresponding direction starts to automatically blink.

Therefore, the first reference steering angle must be set to a level that enables the vehicle to be in the situation which it changes the lane without traveling straight, and may be set to, for example, a range of 20° to 50°. The second reference distance may be set to, for example, the range of 0 to 20 cm so that the driver's intention to change the lane can be identified.

The lane change determination step S170 may be configured to determine that the current situation is a lane change situation when another vehicle is not present in a blind spot of the vehicle, based on the blind spot information received from the blind spot information provision device 15, in addition to the determination based on both the steering angle and the lane information.

Further, the lane change determination step S170 may determine that the current situation is a lane change situation when it is determined that the driver is in a normal state, based on the driver information from the driver information provision device, in addition to the determination based on both the steering angle and the lane information.

The lane change determination step S170 may determine whether the current situation is a lane change situation in consideration of both the blind spot information and the driver information, in addition to the determined based on both the steering angle and the lane information. That is, even if the steering angle is equal to or greater than the first reference steering angle and the distance between the lane and the vehicle body is reduced to the second reference distance or less, the turn signal light is automatically turned on only when it is determined that the driver is not in a dozing state and that another vehicle does not appear in a blind spot present in a side-rear portion of the vehicle, thus enabling the turn signal light to more suitably and automatically start to blink.

The auto-off subroutine S200 includes a switch direction check step S210 of checking which one of the left direction and right direction of the turn switch 1 in the multifunction switch 3 has been turned on; a release determination step S220 of determining whether a release condition for the turn switch 1 for the direction, checked at the switch direction check step S210, is satisfied; and an off step S230 of turning off the turn signal light for the direction determined to satisfy the release condition at the release determination step S220.

A turn switch release condition determined at the release determination step S220 determines a case where the steering angle from the steering angle provision means 5 becomes equal to or greater than a second reference steering angle and then returns to its original position, wherein the second reference steering angle is set to a level indicating that steering is performed in the same direction as the turn-on direction of the turn switch 1, and a case where steering is performed when the steering angle from the steering angle provision means 5 becomes equal to or greater than a third reference steering angle in a direction opposite to the turn-on direction of the turn switch, thus determining that the release condition is satisfied when one or more of the above two cases occur.

That is, the case where the steering angle becomes equal to or greater than the second reference steering angle and then returns to its original position is determined to be the case where steering has been performed in the direction that the turned-on turn switch indicates, and then the steering wheel returns to the neutral position, and the turn signal light is automatically turned off and the user convenience is improved.

Therefore, the second reference steering angle must be set to a level which indicates that steering is performed in the same direction as the turn-on direction of the turn switch, and may be set to, for example, a value of about 40 to 50°.

Here, the third reference steering angle is set such that, even if the driver performs steering in a direction opposite to a turning direction so as to avoid, for example, an obstacle while turning to the direction in which the turn switch is turned on, steering is performed in the initial turning direction without immediately turning off the turn signal light, and the state of the turn signal light may be maintained until the current turning is completed. The third reference steering angle may be set to, for example, about 180°.

That is, it is assumed that that the driver detects an obstacle such as a puddle while driving the vehicle by turning on a left turn signal light and by manipulating the steering wheel to the left so as to turn to the left. When the driver manipulates the steering wheel to the right at an angle of 100° in order to avoid puddle and then manipulates the steering wheel to the left again to complete the left turn, the left turn signal light does not automatically turn off even if the steering wheel temporarily turns to the direction opposite to the turn-on direction of the turn switch at the angle of 100°, and the blinking state is maintained without a change, thus securing stability of the operation of the turn signal light 13.

Further, the turn switch release condition determined at the release determination step is determined to be satisfied when the driver manually manipulates the multifunction switch in the direction identical or opposite to the current turn-on direction of the turn switch 1.

This is intended to accept the driver's intention to manually release the turn-on state of the turn signal light when the driver's intention is input through the multifunction switch 3.

Further, the turn switch release condition determined at the release determination step S220 is satisfied: when the steering angle from the steering angle provision means is maintained at a fourth reference steering angle or less, wherein the fourth reference steering angle is less than the steering angle that reaches an angle for a direction change or lane change; when the vehicle speed from the vehicle speed information provision device is maintained at a reference vehicle speed or more, wherein the reference vehicle speed is set to indicate that the vehicle is traveling; and when the period of time for which the turn-on state is maintained after the turn switch has been turned on exceeds a predetermined reference time or longer.

This is intended to automatically turn off the turn signal light 13 when erroneous manipulation occurs or when a lane change completes. When a state, in which the steering angle is maintained at the fourth reference steering angle or less to cause the vehicle to travel almost in a straight line while the vehicle speed is maintained at the reference vehicle speed or more, continues for a reference time or longer after the turn switch has been turned on, it may be determined that the multifunction switch 3 is erroneously manipulated or a lane change is completed and the vehicle is traveling straight.

Therefore, the fourth reference steering angle may be set to, for example, the range of 10° to 20° so that it can be determined that current steering is not for a direction change or lane change. The reference vehicle speed may be set to, for example, the range of 40 kph to 60 kph, and the reference time may be set to, for example, 10 seconds or longer.

The present disclosure may further include a smart switch 30 configured to provide the controller 11 with a signal required to turn on/off a smart function depending on the user's manipulation. The controller 11 is configured to use the results of comparing the steering angle from the steering angle provision means with reference steering angles based on the current situation of the vehicle to control the blinking state of the turn signal light. The controller 11 may be configured to, when the smart switch 30 is turned on, vary the reference steering angles in association with the vehicle speed, and apply the varied reference steering angles.

Figure 5:
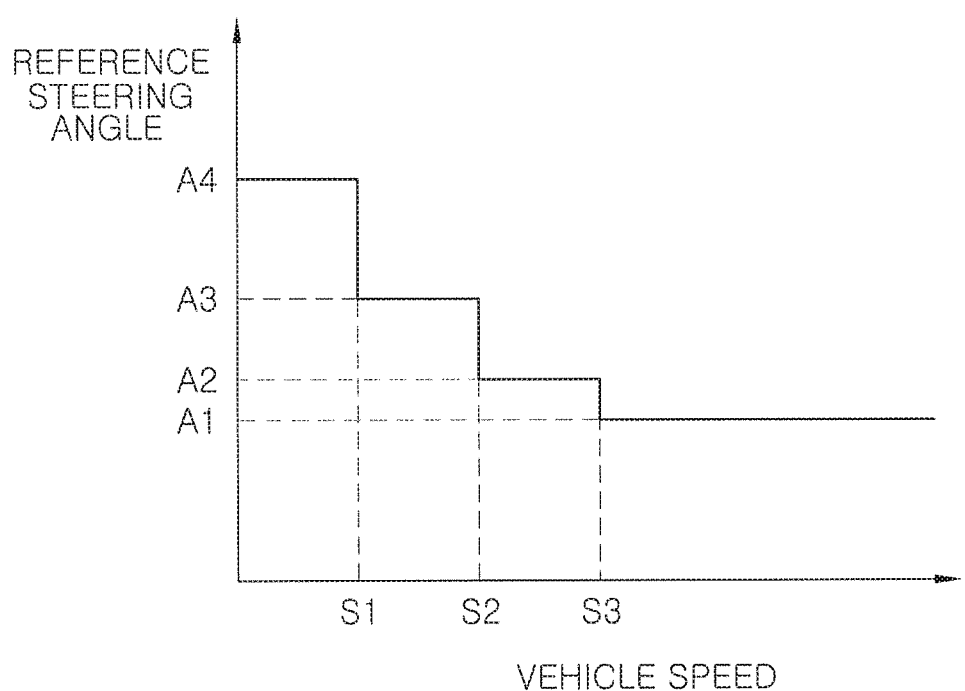
FIG. 5 is a graph showing an example in which variation in a reference steering angle is implemented in stages depending on the vehicle speed according to the present disclosure.
Figure 6:
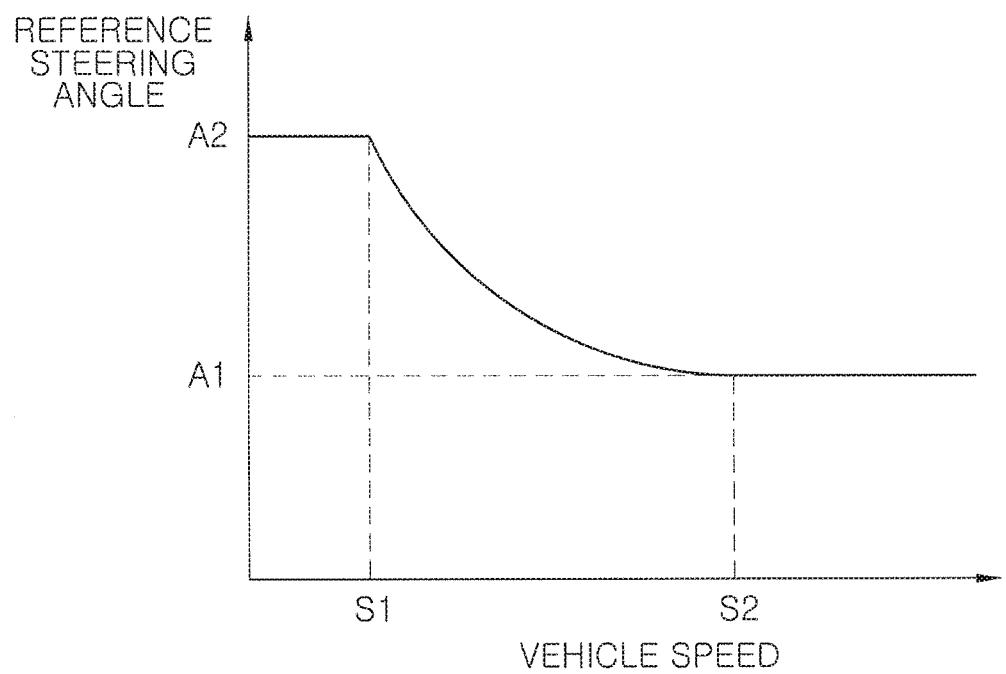
FIG. 6 is a graph showing an example in which variation in a reference steering angle is implemented as an exponential function that is decreased depending on the vehicle speed according to the present disclosure.

That is, the reference steering angles (first reference steering angle, second reference steering angle, third reference steering angle, and fourth reference steering angle) may vary in association with the vehicle speed depending on, for example, the relationship such as that shown in FIG. 5 or 6.

FIG. 5 illustrates a case where, as the vehicle speed increases to S1, S2, and S3, the reference steering angle is set to smaller values by stages, for example, A3, A2, and A1, and FIG. 6 illustrates the case where, as the vehicle speed increases from S1 to S2, the reference steering angle may exponentially decrease from A2 to A1 and may then be set.

Among the reference steering angles, the first reference steering angle is described as an example. The first reference steering angle is a criterion for determining whether the steering angle is a degree that enables the determination of a lane change to be performed. When the vehicle speed is higher in a lane change, the steering angle is set to be smaller than that when the vehicle speed is lower. Therefore, when the vehicle speed is relatively low, the first reference steering angle may be set to, for example, about 40°, whereas when the vehicle speed is relatively high, the first reference steering angle may be set to, for example, about 20°, thus enabling an actual vehicle travel situation to be exactly recognized.

For reference, unlike the configuration shown in FIG. 1, the smart switch 30 may be replaced by changing the configuration of the menu on a device, such as the AVN system, and may also be configured to allow the device, such as the AVN system, to select whether to use an automatic on/off function for the turn signal light according to the present disclosure.

Referring to FIG. 2, a method for controlling a turn signal for an electronic multifunction switch according to the present disclosure includes the turn switch state check step S10 of the controller checking whether the turn switch provided in the multifunction switch has been turned on or off; the auto-on subroutine S100 of the controller blinking the turn signal light of the vehicle by automatically turning on a turn signal when the turn switch has been turned off as a result of performing the turn switch state check step; and the auto-off subroutine S200 of the controller turning off the turn signal light by automatically turning off the turn signal when the turn switch is turned on as a result of performing the turn switch state check step.

The auto-on subroutine S100 and the auto-off subroutine S200 are substantially identical to those described above, and thus a detailed description thereof will be omitted.

As described above, the apparatus and method for controlling a turn signal for an electronic multifunction switch according to the present invention not only can cancel manipulation noise caused by the manipulation of the multifunction switch and the operation of an auto-cancel function, but also can automatically generate and release a lane change signal and a direction change signal without user's intentional manipulation, and the present invention can reduce concern about erroneous manipulation. Further, the apparatus and method for controlling a turn signal for an electronic multifunction switch according to the present invention can automatically perform control to meet a driving situation even if erroneous manipulation has occurred, thus maximizing user convenience and ultimately improving marketability of vehicles.

Although the exemplary embodiments have been disclosed for illustrative purposes, those skilled in the art will appreciate that various modifications, additions, and substitutions are possible, without departing from the scope and spirit of the invention as disclosed in the accompanying claims.

What is claimed is:

1. An apparatus for controlling a turn signal for an electronic multifunction switch, comprising:
  the multifunction switch including a turn switch;
  a steering angle provision device configured to provide information about a steering angle of a vehicle;
  a path provision device for configured to provide information about a location and a path of the vehicle;
  a lane information provision device configured to provide information about lanes around the vehicle; and
  a controller configured to receive manipulation state information of the multifunction switch, the steering angle information from the steering angle provision device, the location and path information from the path provision device, and the lane information from the lane information provision device, controller further configured to control a blinking state of a turn signal light of the vehicle, and
  wherein the controller is configured to:
    execute an auto-on subroutine of blinking the turn signal light by automatically turning on the turn signal when the turn switch is off, and
    execute an auto-off subroutine of turning off the turn signal light by automatically turning off the turn signal when the turn switch is turned on,
  wherein the auto-on subroutine comprises:
    a path acquisition operation acquiring the information about the location and the path of the vehicle from the path provision device;
    a direction change determination operation of determining that a current situation is a direction change situation when a current location of the vehicle is present within a first reference distance from an approaching turning point on a travel path of the vehicle, based on the information about the location and the path of the vehicle;
    a turning direction determination operation of determining whether a turning direction is for left turn or right turn when the current situation is the direction change situation as a result of performing the direction change determination operation; and
    a direction change blinking initiation operation of blinking the turn signal light for the corresponding direction, based on a result of performing the turning direction determination operation, and
  wherein the auto-on subroutine further comprises:
    a steering level determination operation of, when the current situation is not the direction change situation as the result of performing the direction change determination operation, determining whether the steering angle is equal to or greater than a reference steering angle that is set to determine a lane change of the vehicle;
    a lane information acquisition operation of, when the steering angle is equal to or greater than a first reference steering angle as a result of performing the steering level determination operation, acquiring the lane information from the lane information provision device;
    a lane change determination operation of determining that the current situation is a lane change situation when a distance between the vehicle and a lane that the vehicle is approaching is within a second reference distance which determines a lane change of the vehicle, based on the lane information acquired in the lane information acquisition operation;
    a lane change direction determination operation of, when it is determined in the lane change determination operation that the current situation is the lane change situation, determining whether the lane change is a change to a left lane or to a right lane; and
    a lane change blinking initiation operation of, based on a result of performing the lane change direction determination operation, blinking the turn signal light for the corresponding direction.

2. The apparatus of claim 1, further comprising a blind spot information provision device configured to provide the controller with blind spot information indicating whether another vehicle is present in a blind spot of the vehicle,
  wherein the lane change determination operation determines that the current situation is the lane change situation when the other vehicle is not present in the blind spot of the vehicle, based on the blind spot information from the blind spot information provision device.

3. The apparatus of claim 2, further comprising a driver information provision device configured to provide driver information about a state of a vehicle driver to the controller,
    wherein the lane change determination operation is configured to determine that the current situation is the lane change situation when the driver is in a normal state, based on the driver information from the driver information provision device.

4. The apparatus of claim 1, wherein the auto-off subroutine comprises:
    a switch direction check operation of checking which one of a left direction and a right direction of the turn switch in the multifunction switch is on;
    a release determination operation of determining whether a turn switch release condition for the turn switch for a direction based on a result of performing the switch direction check operation is satisfied; and
    an off operation of turning off the turn signal light for the direction determined to satisfy the turn switch release condition in the release determination operation.

5. The apparatus of claim 4, wherein the turn switch release condition determined in the release determination operation determines:
    a first case where the steering angle from the steering angle provision device becomes equal to or greater than a second reference steering angle and then returns to an original position, wherein the second reference steering angle is set to indicate that steering is performed in a direction identical to a turn-on direction of the turn switch; and
    a second case where steering is performed in a state in which the steering angle from the steering angle provision device is equal to or greater than a third reference steering angle in a direction opposite to the turn-on direction of the turn switch, and
    wherein when one or more of the first and second cases occur, it is determined that the turn switch release condition is satisfied.

6. The apparatus of claim 4, wherein the turn switch release condition determined in the release determination operation is satisfied when a driver manually manipulates the multifunction switch in a direction identical to or opposite to a current turn-on direction of the turn switch.

7. The apparatus of claim 4, further comprising a vehicle speed information provision device configured to provide information about a speed of the vehicle to the controller,
    wherein the turn switch release condition determined in the release determination operation is satisfied when:
    the steering angle from the steering angle provision device is maintained at a fourth reference steering angle or less, wherein the fourth reference steering angle is set to be less than an angle to change the direction or lane;
    the speed of the vehicle from the vehicle speed information provision device is maintained at a reference vehicle speed or more, wherein the reference vehicle speed is set to indicate that the vehicle is traveling; and
    when a period of time for which a turn-on state is maintained after the turn switch is turned on exceeds a reference time or longer.

8. The apparatus of claim 1, further comprising a smart switch configured to provide a signal required to turn on or off a smart function depending on driver manipulation to the controller,
    wherein the controller is configured to compare the steering angle from the steering angle provision device with a reference steering angle based on a current situation of the vehicle to control a blinking state of the turn signal light, and
    wherein the controller is configured to, when the smart switch is turned on, vary the reference steering angle in association with a vehicle speed and apply the varied reference steering angle.

9. A method for controlling a turn signal for an electronic multifunction switch, comprising:
    a turn switch state check operation of checking, by a controller, a state indicating whether a turn switch provided in the multifunction switch, is turned on or off;
    an auto-on subroutine of, when the turn switch is turned off as a result of performing the turn switch state check operation, blinking, by the controller, a turn signal light of a vehicle by automatically turning on the turn signal; and
    an auto-off subroutine of, when the turn switch is turned on as a result of performing the turn switch state check operation, turning off, by the controller, the turn signal light by automatically turning off the turn signal, and
    wherein the auto-on subroutine comprises:
    a path acquisition operation of acquiring information about a travel path and a current location of the vehicle from a path provision device;
    a direction change determination operation of determining that a current situation is a direction change situation when the current location of the vehicle is present within a first reference distance from an approaching turning point on the travel path, based on the travel path and the current location of the vehicle;
    a turning direction determination operation of determining whether a turning direction is for left turn or right turn when the current situation is the direction change situation as a result of performing the direction change determination operation; and
    a direction change blinking initiation operation of blinking the turn signal light for the corresponding direction, based on a result of performing the turning direction determination operation, and
    wherein the auto-on subroutine comprises:
    a steering level determination operation of, when the current situation is not a direction change situation as a result of performing the direction change determination operation, determining whether a steering angle provided from a steering angle provision device is equal to or greater than a first reference steering angel that is set to determine a lane change of the vehicle;
    a lane information acquisition operation of, when the steering angle is equal to or greater than the first reference steering angle as a result of performing the steering level determination operation, acquiring lane information from a lane information provision device;
    a lane change determination operation of determining that the current situation is a lane change situation when it is checked that a distance between the vehicle and a lane that the vehicle is approaching is within a second reference distance which determines a lane change of the vehicle, based on the lane information acquired in the lane information acquisition operation;
    a lane change direction determination operation of, when it is determined in the lane change determination operation that the current situation is the lane change situation, determining whether the lane change is a change to a left lane or to a right lane; and a lane change blinking initiation operation of, based on a result of performing the lane change direction determination operation, blinking the turn signal light for the corresponding direction.

10. The method of claim 9, wherein the lane change determination operation determines that the current situation is the lane change situation when another vehicle is not present in a blind spot of the vehicle, based on blind spot information from a blind spot information provision device for providing the controller with the blind spot information indicating whether the other vehicle is present in the blind spot of the vehicle.

11. The method of claim 9, wherein the lane change determination operation determines that the current situation is the lane change situation when a vehicle driver is in a normal state, based on driver information from a driver information provision device for providing information about a state of the vehicle driver to the controller.

12. The method of claim 9, wherein the auto-off subroutine comprises:
   a switch direction check operation of checking which one of a left direction and a right direction of the turn switch in the multifunction switch is on;
   a release determination operation of determining whether a turn switch release condition for the turn switch for a direction based on a result of performing the switch direction check operation is satisfied; and
   an off operation of turning off the turn signal light for the direction determined to satisfy the turn switch release condition in the release determination operation.

13. The method of claim 12, wherein the turn switch release condition determined in the release determination operation determines:
   a first case where the steering angle from the steering angle provision device becomes equal to or greater than a second reference steering angle and then returns to an original position, wherein the second reference steering angle is set to indicate that steering is performed in a direction identical to a turn-on direction of the turn switch; and
   a second case where steering is performed in a state in which the steering angle from the steering angle provision device is equal to or greater than a third reference steering angle in a direction opposite to the turn-on direction of the turn switch, and
   wherein when one or more of the first and second cases occur, it is determined that the turn switch release condition is satisfied.

14. The method of claim 12, wherein the turn switch release condition determined in the release determination operation is satisfied when a driver manually manipulates the multifunction switch in a direction identical to or opposite to a current turn-on direction of the turn switch.

15. The method of claim 12, wherein the turn switch release condition determined in the release determination operation is satisfied when:
   the steering angle from the steering angle provision device is maintained at a fourth reference steering angle or less, wherein the fourth reference steering angle is set to be less than that of a direction change or lane change;
   a vehicle speed from a vehicle speed information provision device for providing vehicle speed information to the controller is maintained at a reference vehicle speed or more, wherein the reference vehicle speed is set to indicate that the vehicle is traveling; and
   a period of time for which a turn-on state is maintained after the turn switch is on exceeds a reference time or longer.

* * * * *